United States Patent [19]
Wink et al.

[11] Patent Number: 5,644,468
[45] Date of Patent: Jul. 1, 1997

[54] METALLIZED WOUND-DIELECTRICALIZATION CONDENSER X-Y MULTIPLE CAPACITANCES

[75] Inventors: Reinhold Wink; Mathias Gruner, both of Schlitz, Germany

[73] Assignee: Eichhoff GmbH, Schlitz, Germany

[21] Appl. No.: 618,916

[22] Filed: Mar. 20, 1996

[30] Foreign Application Priority Data

Mar. 23, 1995 [DE] Germany ................... 195 10 624.5

[51] Int. Cl.⁶ .................. H01G 4/38; H01G 2/20
[52] U.S. Cl. ................. 361/330; 361/301.5; 361/308.1
[58] Field of Search .............. 361/301.5, 306.1, 361/307, 308.1, 328–330, 511, 515, 530, 531, 541

[56] References Cited

U.S. PATENT DOCUMENTS

| | | |
|---|---|---|
| 3,273,027 | 9/1966 | Bourgault et al. |
| 3,921,041 | 11/1975 | Stockmann. |
| 4,586,112 | 4/1986 | MacDougall ................ 361/330 |
| 5,179,362 | 1/1993 | Okochi. |

FOREIGN PATENT DOCUMENTS

| | | |
|---|---|---|
| 0090170 | 10/1983 | European Pat. Off. |
| 0109090 | 5/1984 | European Pat. Off. |
| 0215361 | 3/1987 | European Pat. Off. |
| 0222547 | 5/1987 | European Pat. Off. |
| 7829925 | 1/1979 | Germany. |
| 3319333 | 11/1984 | Germany. |

*Primary Examiner*—Bot L. Ledynh
*Attorney, Agent, or Firm*—Herbert Dubno

[57] ABSTRACT

An X-Y condenser having an X-capacitance and two Y-capacitances, for example, for connection as a line filter, has a base winding of metallized dielectric foil strip on which a pair of axially spaced auxiliary windings are applied. A deposited metal contact at each end connects each Y-capacitance winding with the X-capacitance winding while a metal deposit between the Y-capacitance windings forms a common contact therewith.

9 Claims, 3 Drawing Sheets

5,644,468

METALLIZED WOUND-DIELECTRICALIZATION CONDENSER X-Y MULTIPLE CAPACITANCES

FIELD OF THE INVENTION

Our present invention relates to a wound-dielectric capacitor, i.e. a capacitor using metallized synthetic resin foils or paper strips, which have multiple capacitances or are constituted as multiple condensers and especially so-called X-Y condensers for interference elimination. Such condensers utilize at least one coil of the dielectric which is provided in a foil strip, i.e. the synthetic resin foil or the paper, on a surface of which, at least one metal strip or metalization strip is provided, the or each metalization strip being formed as an edge strip or as a central strip. An edge strip is one which runs to the longitudinal edge of the foil while a central strip is one which may be deposed inwardly of the longitudinal edge of the foil along a center thereof. Such capacitors also have metallized contacts which allow the respective capacitances of the capacitor to be connected differently in the circuit.

BACKGROUND OF THE INVENTION

Multiple-capacitance condensers are utilized for interference abatement, e.g. as power line filters, electromagnetic interference suppression devices and, in general, to eliminate radio-frequency interference. As described, in U.S. Pat. No. 5,179,362, for example, X-capacitors and Y-capacitors may be provided as line filters in which, for example, two Y-capacitors are provided, one of which is connected between the phase or a load line and the protective line or ground while the other Y-capacitance is connected between the neutral line and the protective line or ground. The X-capacitance is connected between the phase or load line and the neutral line. All three capacitances can be incorporated in an X-Y-condenser or capacitor so that in a single unit a multiplicity of capacitances are provided which can be connected in various ways. Such multiple capacitance systems are provided in a variety of configurations.

For example, EP-B-0 090 170 describes a capacitive filter with one winding which is composed of at least a first strip of dielectric material which has at least one continuous metal coating leaving the sides of the strips uncovered and at least a second strip of a dielectric material having two continuous metal coatings which extend to the lateral edges of the strip and are separated by a zone free from a metal coating. The tapping of the various capacitances from this unit utilizes at least one cut out in the coil which extends from an end of the coil substantially to the separating zone between the metal coatings of the second strip.

To form a condenser with at least one X-capacitance and two Y-capacitances, two cut outs in the condenser coil are necessary. These cut outs can be obtained by a milling operation and to ensure optimal self-healing characteristics of the mechanically-divided condenser coil segments, these cuts generally should be inclined to the axis. This method of fabricating a condenser with multiple capacitances has been found to be very expensive and disadvantageous because it requires, in addition to the machines which are usually provided for winding of the condenser and packaging of the wound condenser, at least one high-precision milling machine and the equipment and space necessary for transporting the condenser body between machines, for delivering the condenser blank to carrying the milled condenser blank away from the milling machine, etc.

The high cost of such a system has been recognized heretofore and in EP-B-0 190 090, a process has been proposed for producing a condenser with a winding which allows the fabrication of multiple capacitances, utilizing a demetalized zone at least in one of the metal layers and usually in each of the windings. These demetalized zones should be oriented substantially radially in the turns of the winding. For the production of an X-Y-condenser, three such demetalized zones are necessary, preferably in a star-shaped arrangement. The demetalization must be provided for each layer of the winding and thus during each turn thrice in the case in which the demetalized zones subdivide the winding into three segmental capacitances. An electrode must be vapor-deposited at appropriate locations of the metalization on the foil. The process of fabricating the multiple-capacitance condenser is greatly slowed by the added steps required and, indeed, this method of fabricating multiple-capacitance condensers has been found to be largely uneconomical. In fact, even though milling machines are not required, the process has been found to be far too expensive to be used for economical mass production of multiple-capacitance condensers.

EP-B-0 222 547 describes a further condenser with multiple capacitances which can be wound from a greater number of dielectric and electrically-conducting strips and which requires that conductor strips be wound into the coil during the winding process to allow the capacitances to be tapped from the condenser. Ultrasonic welding or similar techniques are used to bond the connecting strips with the foils to which connection must be made. This construction has also been found to be excessively expensive and cannot be utilized effectively with paper-metal-foil condensers, with metalized plastic foil condensers, with metalized paper condensers, i.e. the types of condensers with which the invention is primarily concerned.

Finally, mention may be made of EP-P-0 215 361 which describes a wound condenser with multiple capacitances in which the individual capacitances are separated from one another by cuts into the winding. This system and the problems thereof are similar to those which obtain with EP-B-0 190 090.

OBJECTS OF THE INVENTION

It is, therefore, the principal object of the present invention to provide an improved metalized synthetic resin foil or paper foil condenser with multiple capacitances, especially for use as an X-Y-condenser for interference suppression in load lines, i.e. as a power-line filter condenser, which can be fabricated more simply than earlier multiple-capacitance condensers, requires only a conventional condenser winding machine and not a costly precision milling machine or the like, and otherwise is free from drawbacks of the prior art as described above.

Another object of the invention is to provide an improved multiple capacity condenser which can be fabricated in a more cost-effective manner than earlier devices for the same purpose and which is particularly suitable for mass production.

Still another object of the invention is to provide an improved condenser, especially for use as an X-Y-condenser in a line filter, whereby drawbacks of earlier line-filter condensers are eliminated.

SUMMARY OF THE INVENTION

These objects and others which will become apparent hereinafter are attained, in accordance with the invention, by providing a condenser which is wound with a first winding (base winding) having connecting contacts at its ends and two axially-spaced second windings (additional windings) concentrically surrounding the base winding and connected respectively to the connecting contacts, but providing additional windings. The base winding can form the X-capacitance and each additional winding one of the Y-capacitances.

More particularly, a winding-dielectric multiple-capacity condenser can comprise:

a first winding of a dielectric foil having at least one metallized strip thereon, the first winding having opposite axial ends;

respective connection contacts on the opposite axial ends of the first winding conductively connected to the metallized strip thereof;

a pair of axially spaced second windings of dielectric foils coaxially surrounding the first winding, each of the dielectric foils of the second windings having at least one metallized strip thereon electrically insulated from the metal strip of the first winding; and means forming a common central contact conductively connected to the metallized strips of the second windings, the metallized strips of the second windings being conductively connected to the connection contacts.

According to a feature of the invention, each of the connecting contacts, the connections thereof to the respective leads, the common central contact and its lead may be formed by metal spraying or the leads can be connected to the contacts by metal spray junctions.

One or more of the windings can each be provided with metalized strips so that one of them or each of them constitutes two series-connected capacitances.

Finally, it has been found to be advantageous to so wind the windings that the leading turns of the additional or auxiliary windings overlap the outer turn of the first or base winding with suitable insulation of the metal strips of the outer windings form the base winding.

The result is a metalized plastic foil or paper condenser with multiple capacitance whose base winding is wound like any conventional metalized single-capacitance condenser. This winding, however, carries in addition to further windings which are coaxial with the base winding and form the two Y-condensers. They have common contacts with the X-capacitance base condenser and also have a common central contact for tapping between the Y-capacitances. The result is a metalized multiple-capacitance condenser whose X-capacitance is closely surrounded by the Y-capacitance so that the overall module is exceptionally compact.

Indeed coaxial condensers with multiple capacitances are found in the art, for example, in U.S. Pat. No. 3,921,041, in which a second winding is coaxial to the base winding. Here, however, the second winding has the same axial extent as the base winding. At one end of this double-winding condenser, there is a common connection contact to the two windings while at the other end, separate contacts are provided for connection to the two windings. The purpose of this system is to provide two capacitors in a small space and as the circuit of FIG. 6 of this document shows, the device is utilized only in paired-condenser applications in situations in which two condensers with a common plate may be employed.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
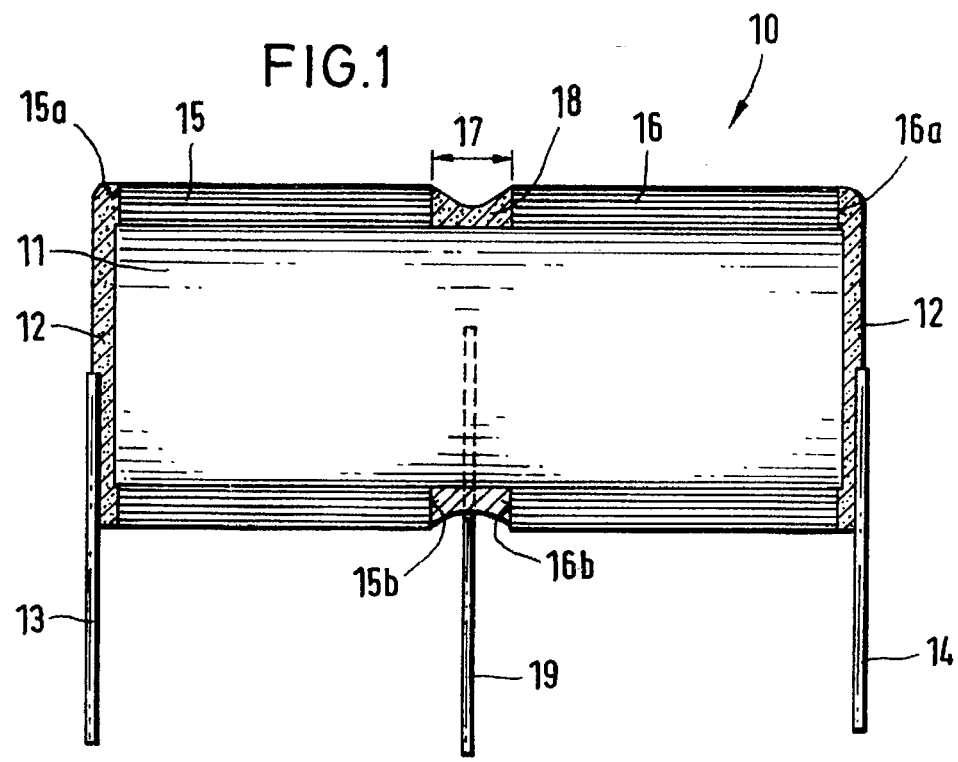
FIG. 1 is a schematic cross sectional view through an X-Y-condenser according to the invention having the inner or base winding forming the X-capacitance and a pair of outer windings forming respective Y-capacitances according to the invention.
Figure 2:
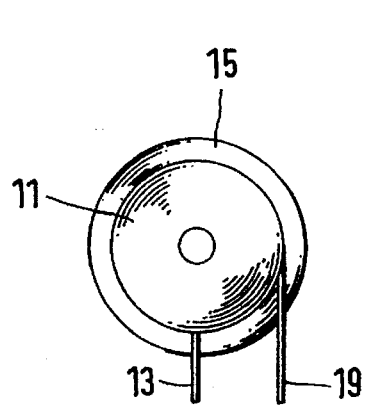
FIG. 2 is a transverse section diagrammatically illustrating the X-Y condenser of FIG. 1, drawn to a smaller scale.

The X-Y condenser shown diagrammatically at 10 in FIG. 1 comprises an inner or base winding 11 with metalized end contacts 12 each formed by spray-metal deposition and respective leads 13 and 14 welded thereto, e.g. by a sprayed metal junction or by soldering or spot-welding.

The metalized layers 12 can be formed continuously by the SCHOOP process in which molten metal (usually zinc and/or tin) is sprayed in one or more steps upon both ends of the winding.

The base winding 11 carries two coaxial second or auxiliary windings 15 and 16 which can be mechanically and electrically identical to one another although this is by no means necessary. The two coils 15 and 16 extend to the ends of the base coil 11 where they receive the metal deposit of the respective contacts 12 at their ends 15a and 16a so that the metal contacts 12 are common to both the base coil and the respective auxiliary coils 15, 16.

In the middle, the two coils 15 and 16 are separated by a gap 17 in which a further spray-metal deposit 18 is provided to form a common contact for the coils 15 and 16 along the inner end faces 15b and 16b thereof. There is no electrical contact at the center of the assembly, however, between the coils 15, 16 and the base coil 11.

The contact 18, which also can be formed by the SCHOOP process, has a lead 19 connected thereto by spray-metal welding tangential to the winding 11 and does not penetrate into it so that it serves only for electrical connection to the contact 18 and not to the base winding 11.

The result is a single condenser having three capacitances, namely, that of the base coil 11 and those of the two auxiliary windings 15 and 16, each of these capacitances being formed by a pair of parallel capacitances as will be apparent from FIG. 3 and as results from the formation of the windings as will be described in connection with FIGS. 4 and 5. The base winding 11 thus forms the X-capacitance from two series connected capacitances X1, X2 which are connected to the ends of the series capacitances Y11, Y12 and Y21, Y22 forming the two Y-capacitances. The leads 13, 14 and 19 have also been shown in FIG. 3. In effect, the two plates 29 of the Y-capacitances Y11, Y12 and the two plates 32 of the Y-capacitances Y21, Y22 are connected together, the plates 28 and 30 are connected to the common contact 18 and the plates 27 and 31 to the contacts 12. For the X-capacitance two plates 24 are connected together while plates 22 and 23 are connected to the contacts 12.

Figure 4:
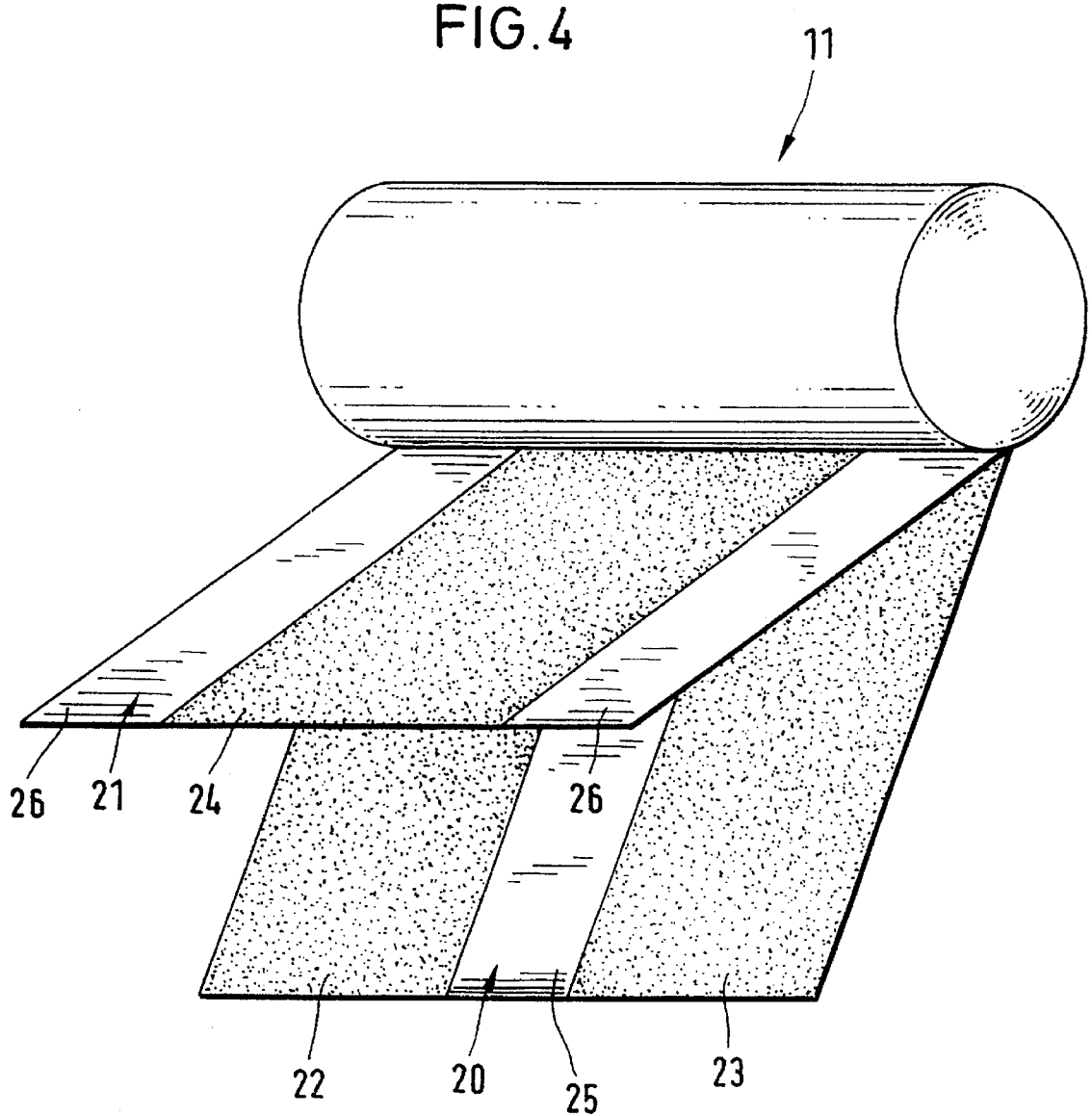
FIG. 4 is a schematic perspective view showing the winding of the X-capacitance base winding of the X-Y capacitor.

From FIG. 4 the "plates" are shown as separate metalizations 22, 23 and 24 on the paper or plastic foils 20 and 21 forming the dielectric. The metalization may result from vapor deposition. On one of the foils, the metal strips 22 and 23 are deposited along the edges of the dielectric strip while on the other foil strip, the metal band is deposited inwardly of the edges of the strip so that on the first band, a gap 25 is free edges of the strip so that on the first band, a gap 25 is free from the metalization whereas on the second band strips 26 along the longitudinal edges are free from metalization.

Figure 5:
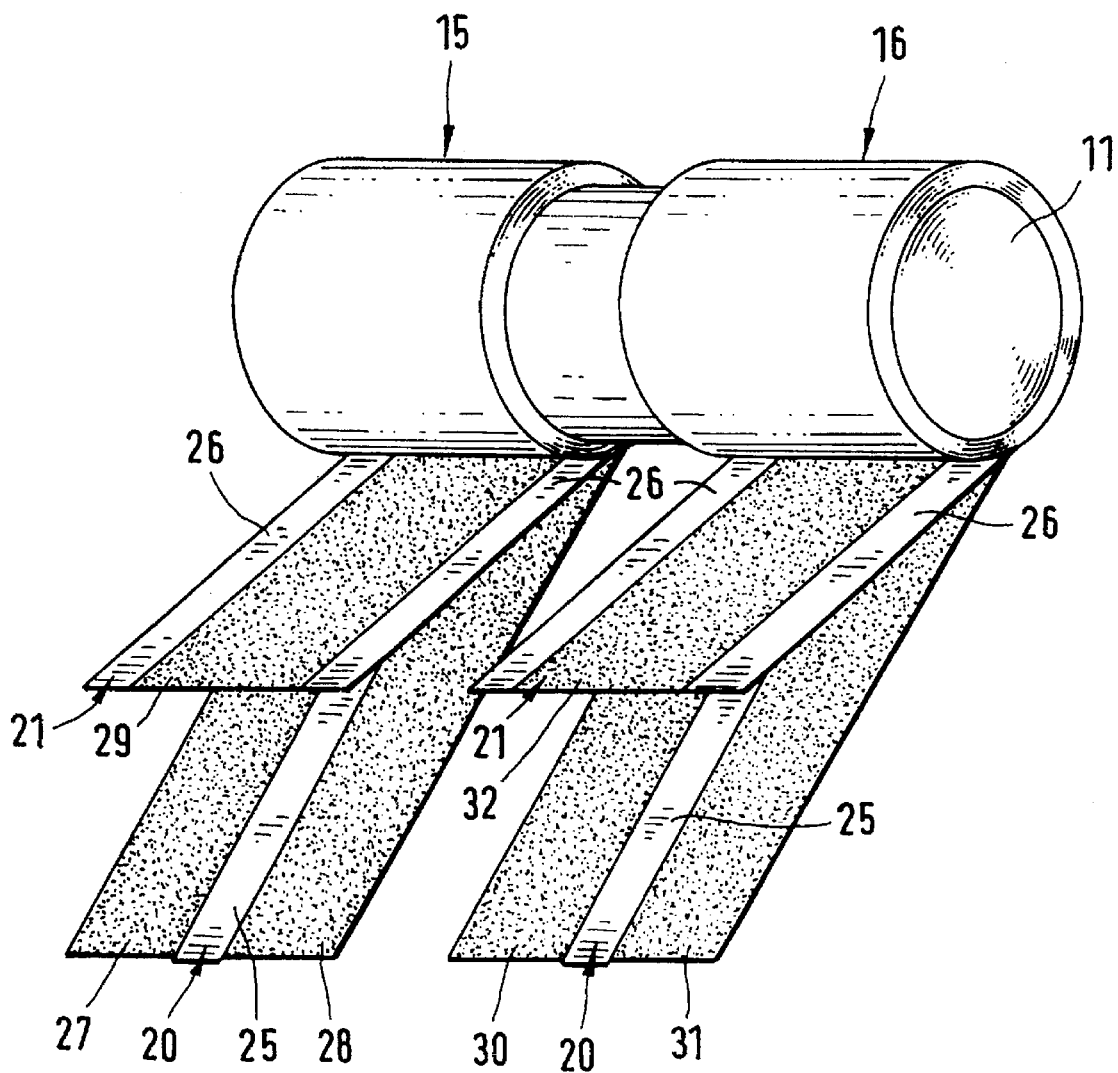
FIG. 5 is a perspective view diagrammatically illustrating the winding of the two Y-capacitance windings.

A similar principle is apparent from FIG. 5 where the plates 29 and 32 are formed with central metalized bands leaving metalization-free zones 26 along the edge on the foil 21. The strips 20 have plates formed by the metalized bands 27, 28, 30 and 31 leaving central strips 25 free form metalization.

Figure 3:
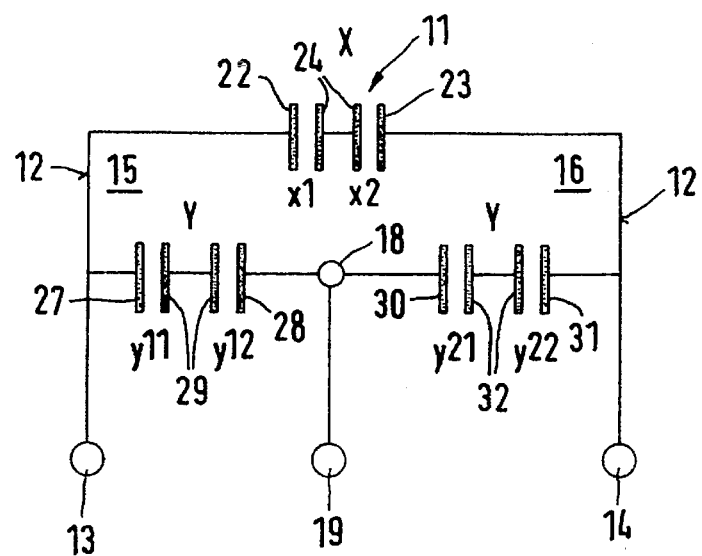
FIG. 3 is a circuit diagram showing the use of the X-Y-condenser of FIG. 1 in an appropriate circuit, e.g. a line-filter circuit.

As a consequence, in effect the X-capacitance and each Y-capacitance is thus made up of two capacitances in series with two plates together as has been illustrated in FIG. 3. The X-Y condenser of the invention can thus be fabricated by a winding process and the use of the SCHOOP process for applying the contacts without any need for machinery or tools to mill or cut into the condenser. The windings 15 and 16 are wound on the winding 11 without any metallic contact between the metalization layers of the windings. Only the contact 18 need be applied through a mask to the unit.

While a cylindrical configuration of the X-Y-condenser has been provided, it will be understood that it can be wound as well with an elliptical configuration or pressed into an elliptical configuration when, for example, the wound capacitor to be received in a small rectangular housing or the like.

We claim:

1. A wound-dielectric multiple-capacity condenser, comprising:

a first winding of a dielectric foil having at least one metallized strip thereon, said first winding having opposite axial ends;

respective connection contacts on said opposite axial ends of said first winding conductively connected to the metallized strip thereof;

a pair of axially spaced second windings of dielectric foils coaxially surrounding said first winding, each of said dielectric foils of said second windings having at least one metallized strip thereon electrically insulated from the metallized strip of said first winding; and means forming a common central contact conductively connected to said metallized strips of said second windings, said metallized strips of said second windings being conductively connected to said connection contacts.

2. The wound-dielectric multiple-capacity condenser defined in claim 1 wherein said second windings extend to said ends of said first winding and are conductively connected to said connection contacts at said ends, respective conductors being joined to said connection contacts.

3. The wound-dielectric multiple-capacity condenser defined in claim 2 wherein said conductors are joined to said connection contacts by a sprayed-metal junction.

4. The wound-dielectric multiple-capacity condenser defined in claim 1 wherein said condenser is an X-Y-condenser in which said first winding is constituted as an X-capacitance bridged between a load line and a neutral line, and each of said second windings is constituted as a respective Y-capacitance with one of the Y-capacitances being bridged between said load line and ground and the other of the Y-capacitances being bridged between said neutral line and ground.

5. The wound-dielectric multiple-capacity condenser defined in claim 1 wherein each of said connection contacts is a sprayed metal contact.

6. The wound-dielectric multiple-capacity condenser defined in claim 1 wherein said common central contact is a sprayed metal contact.

7. The wound-dielectric multiple-capacity condenser defined in claim 1 wherein a conductor is connected to said common central contact by a sprayed metal junction.

8. The wound-dielectric multiple-capacity condenser defined in claim 1 wherein the metallized strip of at least one of said windings forms two series connected capacitances.

9. The wound-dielectric multiple-capacity condenser defined in claim 1 wherein the second windings have starting turns overlapping with but insulated from an outer turn of said first winding.

\* \* \* \* \*